Feb. 20, 1945. G. V. RYLSKY 2,369,802
LIQUID LEVEL
Filed Sept. 3, 1942
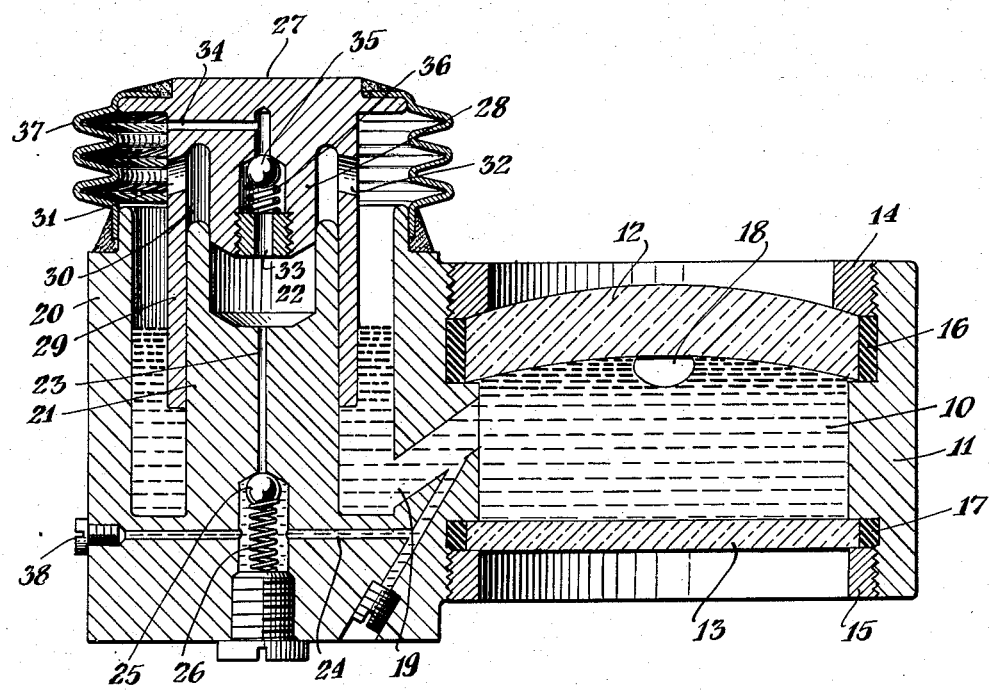
INVENTOR,
G. V. RYLSKY:
BY
ATTORNEY Patented Feb. 20, 1945

2,369,802

UNITED STATES PATENT OFFICE 2,369,802

LIQUID LEVEL

Gregory V. Rylsky, New York, N. Y., assignor to Bendix Aviation Corporation, Bendix, N. J., a corporation of Delaware Application September 3, 1942, Serial No. 457,214

10 Claims. (Cl. 33—212)

The present invention relates to liquid levels adapted for use in sextants, octants, range finders, and other instruments wherein it is desired to provide an artificial horizon by means of a bubble, and more particularly to means for forming the bubble.

An object of the present invention is to provide novel means for a liquid level for rapidly forming an air bubble therein.

Another object of the invention is to provide novel means adapted to act in the nature of a pump for forming an air bubble within a liquid level.

A further object of the invention is to provide a novel liquid level device wherein a bubble of a definite size may be formed by a simple and rapid operation, independently of the surrounding temperature.

Another object of the invention is to provide a novel liquid level device wherein an air bubble may be formed by a simple manual depressing action as distinguished from previously provided adjustable and rotatable knobs.

The above and other objects and advantages of the invention will appear more fully hereinafter from a consideration of the detailed description which follows, taken together with the accompanying drawing wherein a single embodiment of the invention is illustrated. It is to be expressly understood, however, that the drawing is for the purpose of illustration only and is not to be construed as a definition of the limits of the invention.

Referring to the drawing, the single figure thereof constitutes a vertical longitudinal section taken through one form of a liquid level embodying the present invention.

The liquid level, as illustrated, comprises a bubble chamber 10 formed by a cylindrical vessel 11, a top lens 12 and a bottom lens 13, together with retaining rings 14 and 15 for urging the lenses into contact with suitable abutments formed in the cylindrical vessel. Sealing rings 16 and 17 may be provided between the lenses and the vessel to assure an efficient seal for the bubble chamber.

The novel means of the invention are now provided for forming a bubble 18 within the bubble chamber and, to this end, the bubble chamber is connected by means of an inclined passage 19 with a housing 20 formed integrally with or otherwise suitably secured to vessel 11, the housing defining a reservoir or a pumping chamber.

A column member 21, of cylindrical or other suitable shape, is arranged within housing 20 and has formed therein a cylinder 22 which communicates by way of a capillary passage 23, formed in column 21, with a passage 24 communicating with the bubble chamber by way of passage 19. A check valve normally closes off communication between passages 23 and 24 and comprises a ball valve member 25 urged to a closed position by way of a resilient spring 26.

An actuating block 27 is now provided which has formed integrally therewith a piston 28 arranged for reciprocal movement within the cylinder. Block 27, furthermore, is provided with a shell 29 which telescopically cooperates with column member 21 to guide movement of piston 28 within the cylinder. A space or chamber 30 is provided between shell 29 and the piston to facilitate the telescoping action of the shell and the column member and, in order to prevent building up of pressures within chamber 30, orifices 31 and 32 are provided within the shell to communicate space 30 with the exterior of the shell.

Piston 28 is provided with a longitudinal passage 33 communicating with cylinder 22 and a transverse passage 34 communicating the interior of housing 20 with passage 33. A check valve normally closes off communication between passages 33 and 34 and comprises a ball valve member 35 urged to a closed position by way of a resilient spring 36.

Block 27 and housing 20 are interconnected through a flexible Sylphon or bellows member 37 so that the interior of the reservoir or pumping chamber is completely and effectively sealed off from the external air. Member 37, furthermore, is resilient so that it will return to its normal position after a depressing force applied to block 27 has been released.

Any suitable liquid may be provided within housing 20 and bubble chamber 10 by way of passage 24 which is normally closed by means such as a screw 38. Bubble chamber 10 must be completely filled with the liquid and enough liquid should be contained within housing 20 so that the liquid level therein will exceed the liquid level within the bubble chamber. Housing 20 is not filled completely with the liquid so that an air space is provided above the liquid level enclosed by Sylphon member 37. It will now be apparent to those skilled in the art that block 27, piston 28 and cylinder 22 define a pump for pumping air from the air chamber into the bubble chamber to form an air bubble therein.

If the bubble, initially contained within the bubble chamber, is either too large or too small, the liquid level is manually tilted 90° to the right so that all the air from the bubble chamber will be driven through passage 19 into the air space within the pumping chamber defined by housing 20. After the normal horizontal position of the liquid level is restored, the bubble chamber will be completely filled with liquid and there will be no bubble in the chamber.

If the novel liquid level of the present invention is used with a sextant, for example, in the manner disclosed in U. S. Patent No. 2,144,696, issued January 24, 1939, to Richard Weniger and assigned to the assignee of the present application, block 27 may be depressed by the thumb of the hand supporting the sextant for sighting purposes and such depression of the block causes piston 28 to enter into cylinder 22 so that any liquid that may be present within the cylinder or capillary passage 23 will be driven downwardly to unseat ball valve 25 against the action of spring 26 and to pass to the bubble chamber through passage 24 and back into the pumping chamber through passage 19. With the downward stroke of block 27, Sylphon member 37 is compressed so as to create a pressure within the air space, this pressure being sufficient to unseat ball valve 35 against the action of spring 36 to pass air from the air space into the cylinder by way of passages 33 and 34. At the end of the downward stroke of the piston, ball valve 25 will be reseated to close communication between capillary passage 23 and passage 24.

The depressing force upon block 27 subsequently is released and the elastic forces of Sylphon member 37 return the block as well as piston 28 back to a normal position. During the upward movement of piston 28 liquid cannot enter cylinder 22 by way of capillary passage 23 because ball valve 25 is in a closed position and prevents communication between passages 23 and 24.

Block 27 is again depressed and piston 28, in passing downwardly within cylinder 22 drives the air within the cylinder downwardly to unseat ball valve 25 and the air passes into the bubble chamber by way of passages 24 and 19 to form a bubble therein. As the limit of the downward stroke is attained ball valve 25 is seated while ball valve 35 opens and more air is passed into cylinder 22 from the air space.

Subsequent release of block 27, causes Sylphon member 37 to return the block and piston 28 to their initial position for a further operation should the bubble formed within the bubble chamber be too small. In such case the liquid level would be tilted again 90° to the right, to pass the bubble from the bubble chamber to the pumping chamber, and subsequently restored to its normal position at which time block 27 would be depressed to send more air into the bubble chamber thereby forming a larger bubble therein.

The volume and shape of the air space within the pumping chamber above the liquid level is designed so that the liquid cannot pass into cylinder 22 when the complete device is tilted to pass the bubble from the bubble chamber to the pumping chamber.

Even though the air space within the pumping chamber is compressed during a depression of block 27 and Sylphon member 37 the pressure generated within the air space is insufficient to effect proper performance of ball valves 25 and 35. This is true because the volume of the air space is large enough in comparison with the length of piston stroke so that the pressure produced is relatively small. Furthermore, the length of the stroke of the pump or piston 28 may be adjusted by providing an adjustable stop screw within cylinder 22 and in the path of piston 28.

There is thus provided a liquid level with novel bubble forming means therefor which is simple and rapid to operate and which, furthermore, requires but a simple depressing force for pumping and producing an air bubble within the bubble chamber.

While only one embodiment of the present invention has been illustrated and described in detail, it is to be expressly understood, that the invention is not limited thereto. Various changes can be made in the design and arrangement of the parts without departing from the spirit and scope of the invention as will now be understood by those skilled in the art. For example, column member 21 may be cylindrical, rectangular or of any desired and suitable form and in that event the shape of shell 29 must be made to conform to the shape of member 21. For a definition of the limits of the invention, reference will be had primarily to the appended claims.

I claim:

1. A liquid level comprising a bubble chamber, a reservoir having an air space therein and communicating with said bubble chamber, means having communication with said chamber and adapted for pumping air from said air space into said chamber to form a bubble therein, and a yieldable member connecting said means with said reservoir.

2. A liquid level comprising a bubble chamber, a reservoir having an air space therein and communicating with said bubble chamber, a liquid in said bubble chamber and said reservoir, means having communication with said chamber and adapted for pumping air from said air space into said chamber to form a bubble therein, and a flexible member connecting said means with said reservoir.

3. A liquid level comprising a bubble chamber, a reservoir communicating with said chamber, means mounted within said reservoir and having communication with said chamber for pumping an air bubble into said chamber, and a compressible and expansible member connecting said means with said reservoir.

4. A liquid level comprising a bubble chamber, a reservoir communicating with said chamber and having an air space therein, means arranged within said reservoir and having communication with said chamber for pumping air from said air space into said chamber to form a bubble therein, and a resilient sealing member connecting said means with said reservoir.

5. A liquid level comprising a bubble chamber, a reservoir having an air space therein and communicating with said chamber, means comprising a cylinder arranged within said reservoir and adapted for communication with said bubble chamber, a piston adapted for movement within said cylinder and having controllable communication with said air space for pumping air therefrom into said chamber to form a bubble therein, and a flexible member joining said piston with said reservoir.

6. A liquid level comprising a bubble chamber, a reservoir having an air space therein and communicating with said chamber, means comprising a cylinder arranged within said reservoir and adapted for communication with said bubble chamber, a piston mounted for movement within said cylinder and having controllable communication with said air space for pumping air therefrom into said chamber to form a bubble therein, and a compressible and extensible member connecting said piston and said reservoir.

7. A liquid level comprising a bubble chamber, a pumping chamber having an air space therein and communicating with said bubble chamber, a pump within said pumping chamber and having communication with said bubble chamber for pumping air from said air space into said bubble chamber to form a bubble therein, and a yieldable member connecting said pump to said pumping chamber.

8. A liquid level comprising a bubble chamber, a pumping chamber having an air space therein and communicating with said bubble chamber, a pump within said pumping chamber and having communication with said bubble chamber for pumping air from said air space into said bubble chamber to form a bubble therein, and a flexible sealing member connecting said pump to said pumping chamber.

9. A liquid level comprising a bubble chamber, a reservoir having an air space therein and communicating with said bubble chamber, a liquid in said bubble chamber and said reservoir, a cylinder mounted within said reservoir and having means for connecting said cylinder with said bubble chamber, means defining a piston mounted for movement within said cylinder, a passage formed in said piston for communicating said air space with said cylinder, valve means controlling said last-named passage, and a flexible member enclosing said piston and said reservoir whereby upon actuation of said piston said valve means s operated to communicate said air space with said cylinder to generate an air bubble within said bubble chamber.

10. A liquid level comprising a bubble chamber, a reservoir having an air space therein and communicating with said bubble chamber, a liquid in said bubble chamber and said reservoir, a cylinder mounted within said reservoir and having a passage for connecting said cylinder with said bubble chamber, valve means normally closing communication between said passage and said bubble chamber, actuating means defining a piston mounted for movement within said cylinder, a member formed with said actuating means and sleeved about said cylinder to guide said piston within said cylinder, a passage formed in said piston for communicating said air space with said cylinder, second valve means controlling said last-named passage, and a compressible and extensible member sealably joining said actuating means with said reservoir whereby upon actuation of said piston said second valve means is operated to communicate said air space with said cylinder to unseat said first valve means and generate an air bubble within said bubble chamber.

GREGORY V. RYLSKY.